June 9, 1953 C. E. DILTS 2,641,146
BORING AND TURNING MACHINE
Filed Jan. 19, 1946 2 Sheets-Sheet 1

INVENTOR
Carl E. Dilts.
BY Frank C. Fearman
ATTORNEY

June 9, 1953 C. E. DILTS 2,641,146
BORING AND TURNING MACHINE
Filed Jan. 19, 1946 2 Sheets-Sheet 2

INVENTOR
Carl E. Dilts.
BY Frank C. Fearman
Attorney.

Patented June 9, 1953

2,641,146

UNITED STATES PATENT OFFICE 2,641,146

BORING AND TURNING MACHINE

Carl E. Dilts, Saginaw, Mich., assignor of one-half to Joseph H. Hoern, Saginaw, Mich.

Application January 19, 1946, Serial No. 642,352

2 Claims. (Cl. 77—3)

This invention relates to boring and turning machines for boring and/or turning small bearings and similar parts used in engines and mechanical equipment in general.

One of the prime objects of the invention is to design a machine for quickly and accurately machining parts that are impossible or impracticable to rotate because of lack of space and/or out-of-balance condition, and by means of which accurate tapers may be machined on or in a non-rotatable piece.

Another object is to design a machine by means of which mass production of precision finished parts with exact accurate duplication of the parts may be secured.

A further object is to design a contour turning and boring machine in which the motion of the tools and feeding of the "work" is cam controlled and synchronized so that a complete machine operation is performed during each cycle of the machine.

A still further object is to provide a production machine having means for feeding the "work" to the cutting tool, together with means for actuating said cutting tool toward and/or away from the axis of the spindle during the cutting operation, so that any desired predetermined pattern or "work" contour may be followed.

Still a further object is to synchronize the movements of the tool rocking and "work" feeding mechanism, and provide means for tripping the driving mechanism at the end of each "work" cycle so that the machine can be unloaded and again loaded.

A further object of the invention is to provide a machine by means of which one or more parts may be simultaneously machined and/or two or more holes simultaneously machined in the same piece.

To the accomplishment of the foregoing and related ends, said invention then consists of the means hereinafter fully described, and particularly pointed out in the claims, the annexed drawings and following description setting forth in detail certain means and one mode of carrying out the invention, such disclosed means and mode illustrating, however, but one of various ways in which the principle of the invention may be used.

In the drawings:

Fig. 3 is a fragmentary, side-elevational view showing the cutting tool in engagement with the "work."

Fig. 4 is a detail plan view showing the cam arrangement.

Figure 1:
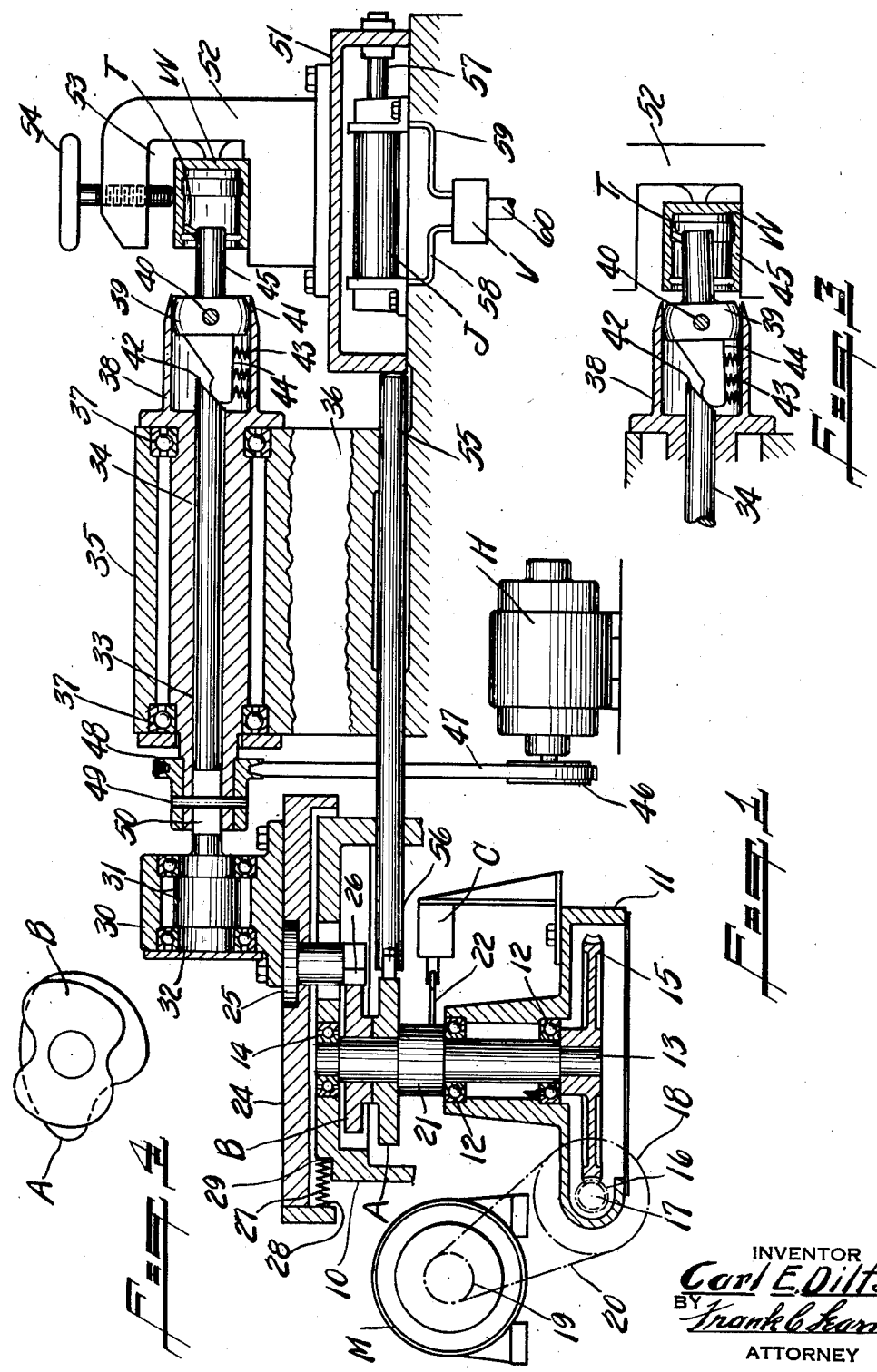
Fig. 1 is a fragmentary, side-elevational, diagrammatic view of my boring and turning machine.
Figure 2:
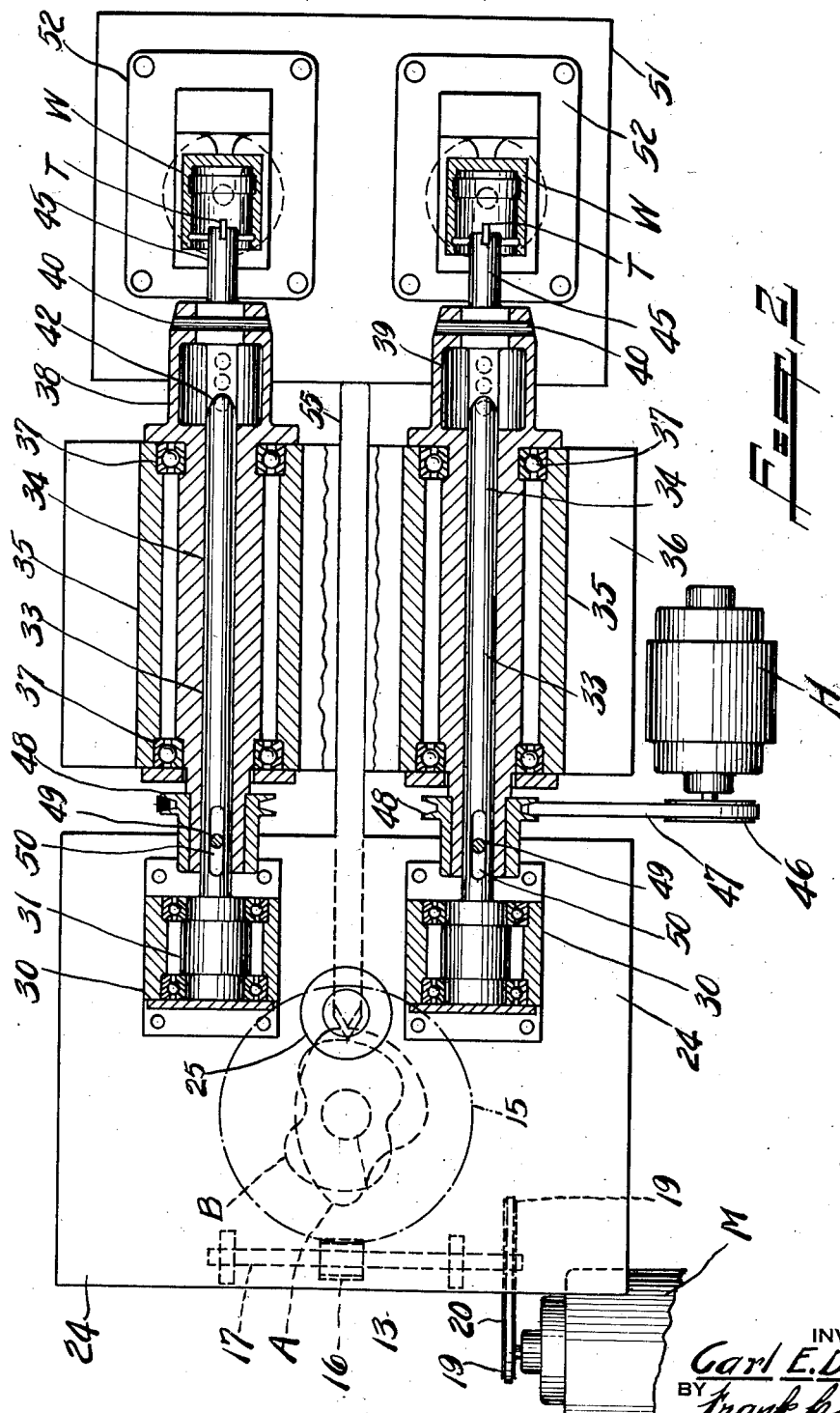
Fig. 2 is a fragmentary, top plan view thereof.

Referring now more specifically to the drawings in which I have shown the prefered embodiment of my invention, there is provided the customary main frame 10 which can be of any desired design.

A gear housing 11 is mounted on the main frame 10 and includes spaced-apart bearings 12 in which a vertically disposed cam shaft 13 is journaled, the upper end of the shaft projecting beyond the housing and is journaled in a bearing 14 provided on the main frame.

A worm gear 15 is mounted on the lower end of the cam shaft 13, said gear meshing with a worm 16 which is in turn mounted on a worm shaft 17, and a drive sheave 18 is mounted on the shaft 17 in the usual manner.

A conventional motor M is mounted on the main frame 10 adjacent the cam shaft 13, and a drive sheave 19 is provided thereon, a drive belt 20 serving to drivingly connect the sheaves 18 and 19 so that the cam shaft 13 will be driven as the motor M is energized.

Cams A and B respectively, are mounted on the upper end of the cam shaft 13, and an enlarged shoulder 21 is provided on said shaft directly adjacent said cams, a trip lever 22 being mounted on said shoulder and is adapted to engage a conventional limit switch C for controlling the drive motor M in a manner to be presently described.

A push rod slide 24 is slidably mounted on the frame 10 above the cam shaft 13, and is actuated by rotation of the cam B, a pin 25 being mounted in said slide and a follower 26 is journaled thereon, this follower engaging the edge of the cam and is held in contact therewith by means of a spring 27 which is interposed between the edge 28 of the slide 24 and spring seat 29 provided in the main frame. The cam B is shaped to provide the required reciprocating movement for the slide, the spring 27 insuring contact of the follower with the formed edge of the cam at all times.

A push rod bracket 30 is mounted on the slide 24, and bearings 31 are provided therein as usual, the head 32 of the push rod 33 being journaled in said bearings with the free end 34 of the rod extending into a spindle 35 which is journaled in a bracket 36 provided on the main frame.

The bracket 36 is provided with longitudinally spaced bearings 37 in which the spindle 35 is journaled, said spindle being bored to accommodate the extending section 34 of the push rod, which rotates therewith, the push rod being relatively movable with relation to the spindle as the slide 24 is actuated.

The housing 38 forms an extension of the spindle 35, and a rocking tool holder 39 is pivotally mounted therein by means of a pin 40, the shank end of the holder being formed with a radius 41 for engagement with the beveled end 42 of the push rod 33, and springs 43 are interposed between the wall of the housing and the shouldered section 44 of the holder to provide the necessary tension. The projecting end 45 of the tool holder is of a form to suit the work, and a tool T is mounted thereon in any desired manner.

The spindle 35 is a driven from a motor H mounted on the main frame, a sheave 46 being keyed on the motor shaft, and a drive belt 47 drivingly connects said sheave with a sheave 48 which is secured on the spindle 35 by means of a pin 49, the rod 34 being slotted as at 50 to permit relative movement of the push rod with relation to the spindle as the slide 24 is actuated.

Rotation of the cam B controls the movement of the slide 24 in the direction indicated by the arrows, the beveled end 42 of the push rod engaging the radius 41 on the holder, and relative movement of the push rod with relation to the spindle causes the tool to swing away from or toward the axis of the spindle so that the tool will bore or turn larger or smaller as desired.

A "work" table 51 is mounted on the main frame 10, and a fixture 52 is mounted on said table, said fixture being recessed as at 53 to accommodate the work W which is mounted therein, and suitable clamping means 54 is provided for rigidly securing the "work" in position.

The movement of the "work" table 51 is controlled by the cam A, and a rod 55 is interposed between the cam A and the table 51, a follower 56 being journaled on the one end of the rod for rolling contact with the turned edge of the cam, with the opposite end bearing against one end of the "work" table.

An air cylinder J is mounted on the main frame, and a piston (not shown) is slidably mounted therein, one end of a piston rod 57 being connected to said piston with the opposite end anchored to the table 51 in any approved manner. Branch air lines 58 and 59 respectively, open into the opposite ends of the cylinder J, thence leading to a solenoid operated air valve V, which is in turn connected to a suitable source of air supply (not shown) by means of an air intake line 60, this arrangement serving to advance the "work" towards the spindle and to hold the follower in engagement with the face of the cam at all times.

It will therefore be obvious that cam A controls the outward movement of the "work" table 51, while the pneumatic means J serves to advance the "work" into engagement with the driven tool, the pattern or contour of the "work" being controlled by the cam B which actuates the slide 24 to move the push rod longitudinally in the spindle and move the cutting tool towards or away from the axis of said spindle, while the motor H drives the push rod and spindle to impart rotation to the cutting tool.

The cycle of the machine is automatic, at the end of each cycle the trip 22 engages and trips the limit switch C stopping the motor M, and the machine is then ready for unloading and again reloading for the next cycle.

*Method of operation*

The operator first loads the work W in the clamping fixture 52, the motors M and H are then energized, the motor H rotating the push rod, spindle and cutting tool, 33, 35, and T respectively, and the motor M drives the cams A and B, the cam B actuating the slide 24 to move the push rod with relation to the spindle and move the tool holder toward or away from the axis of said spindle so that the cutting tool follows a predetermined "work" pattern or contour to be machined.

The cam A and pneumatic means J are simultaneously actuated with the cam B, the cylinder J advancing the "work" table 51, with the "work," forwardly and into engagement with the cutting tool, the follower 56 riding on the face of the cam A and accurately controlling the advance of the table.

When the "work" has advanced sufficiently to complete the cutting stroke, the direction of travel of the "work" table is reversed, the cam A forcing the "work" table outwardly, and when the cycle is completed, the trip lever 22 actuates the limit switch to stop the motor M, the finished parts are then unloaded, after which new, unfinished parts are then loaded in the fixture preparatory to the next cycle. The machine is fully automatic, and the fact that the cams are mounted on a common shaft insures the slide and "work" table being synchronously actuated with the cutting tool as the "work" progresses.

What I claim is:

1. In a tool-operating mechanism of the class described comprising a bracket, a spindle carrier journaled thereon, a spindle mounted therein and including a rockable tool-carrier operable for radial movement about the axis of the spindle, a cutting tool on said carrier, a push-rod slidable in said spindle and formed with a head on the one end thereof, a push-rod slide adjacent said tool-carrier, a bracket mounted thereon, and in which the head of the push-rod is revolvably mounted, a longitudinally movable work-table, a rotatable cam for actuating said push-rod slide to move the free end of the push-rod into engagement with the tool-carrier to rock the tool in a direction away from and toward the axis of the spindle, resilient means opposing said rocking action, pressure means for forcing said table towards the tool, a rotatable cam independent of and synchronized with the push-rod slide actuating cam for controlling the movement of said work-table as it moves the work into engagement with the tool, and means for driving said spindle and a single power input shaft for mounting and rotating both of said cams such that they will rotate in unison with their cam lobes arranged in different angular positions.

2. A machine comprising in combination, a frame, a spindle-carrier mounted thereon, a driven spindle journaled in said carrier and including a tool-holder pivotally mounted at a point intermediate its length for rocking movement about the horizontal axis of the spindle, a cutting tool on said holder, a cam-actuated slide adjacent said spindle, a rotatable cam for said slide, a relatively movable push-rod mounted on said slide and extending into said spindle and formed with a beveled end for engagement with the shank end of said tool-holder to rock said tool holder radially about the axis of the spindle and through a predetermined path of travel, yieldable means interposed between the shank end of the tool-holder and spindle and opposing said rocking action, a longitudinally reciprocable work-table adjacent the cutting tool and on which the work is mounted, pressure-actuated means for moving the work-table towards the tool, cam-actuated means synchronized with the cam-actuated slide for controlling the movement of the work-table with relation to the tool, a rotatable cam for said cam actuated slide independent means for driving said spindle, a single power input shaft upon which both of said rotatable cams are mounted to be driven in unison thereby so that the tool will rock to and fro as the work is controlled and power means for driving said power input shaft.

CARL E. DILTS.

References Cited in the file of this patent

UNITED STATES PATENTS

| Number | Name | Date |
|---|---|---|
| 1,058,940 | Binns | Apr. 15, 1913 |
| 1,233,994 | Dow | July 17, 1917 |
| 1,878,175 | Oyen | Sept. 20, 1932 |
| 1,951,093 | Johnston | Mar. 13, 1934 |
| 1,989,227 | Craley | Jan. 29, 1935 |
| 2,181,873 | Cregar | Dec. 5, 1939 |